United States Patent [19]
Miwa et al.

[11] Patent Number: 4,892,072
[45] Date of Patent: Jan. 9, 1990

[54] SYSTEM FOR MEASURING AMOUNT OF AIR INTRODUCED INTO COMBUSTION CHAMBER OF INTERNAL COMBUSTION ENGINE WITH AVOIDING INFLUENCE OF TEMPERATURE DEPENDENT AIR DENSITY VARIATION AND PULSATILE AIR FLOW

[75] Inventors: Hiromichi Miwa; Hatsuo Nagaishi; Ichirou Kishiki, all of Kanagawa; Hirokimi Koyama, Shizuoka, all of Japan

[73] Assignee: Nissan Motor Company, Limited, Yokohama, Japan

[21] Appl. No.: 195,975

[22] Filed: May 19, 1988

[30] Foreign Application Priority Data

May 19, 1987 [JP] Japan .................. 62-121496

[51] Int. Cl.$^4$ .................. F02D 41/14; F02M 3/00
[52] U.S. Cl. .................. 123/340; 123/494; 123/585
[58] Field of Search .................. 123/340, 494, 492, 585, 123/350, 399, 421, 425, 435, 478

[56] References Cited

U.S. PATENT DOCUMENTS

| | | | |
|---|---|---|---|
| 4,479,472 | 10/1984 | Shimamura | 123/340 |
| 4,559,913 | 12/1985 | Kido | 123/340 |
| 4,580,535 | 4/1986 | Danno et al. | 123/340 |
| 4,625,690 | 12/1986 | Morita | 123/340 |
| 4,667,632 | 5/1987 | Shimomura et al. | 123/340 |
| 4,696,272 | 9/1987 | Kato et al. | 123/340 |
| 4,697,562 | 10/1987 | Boaadoro et al. | 123/340 |
| 4,760,825 | 8/1988 | Morita | 123/340 |

FOREIGN PATENT DOCUMENTS

| | | | |
|---|---|---|---|
| 0155663 | 9/1985 | European Pat. Off. | 123/492 |
| 0185552 | 6/1986 | European Pat. Off. | 123/492 |
| 2142166 | 1/1985 | United Kingdom | 123/492 |

Primary Examiner—Raymond A. Nelli
Attorney, Agent, or Firm—Foley & Lardner, Schwartz, Jeffery, Schwaab, Mack, Blumenthal & Evans

[57] ABSTRACT

A system for measuring intake air amount to be introduced into an engine cylinder employs a throttle angle sensor as a basic intake air flow amount indicative factor. Basic intake air flow amount is derived on the basis of a throttle valve angular position and an engine speed. The basic intake air flow amount is corrected with taking delay factor to introduce the intake air past the throttle valve into the engine cylinder, and a temperature dependent factor compensating variation of air density depending upon the temperature condition.

29 Claims, 15 Drawing Sheets (1) INFLUENCE OF THERMAL EXPANSION (THROTTLE BODY AND THROTTLE VALVE)

(3) INFLUENCE OF AIR DENSITY VARIATION DUE TO FUEL ATOMIZATION (4) INFLUENCE OF INTAKE TEMPERATURE DIFFERENCE IN AIR HORN SECTION AND THROTTLE CHAMBER (1), (3), (4) AND RESULT OF COMPARISON OF MEASUREMENT RESULT

○——○ ACTUALLY MEASURED VALUE
●——● SUM OF (1), (3), (4)

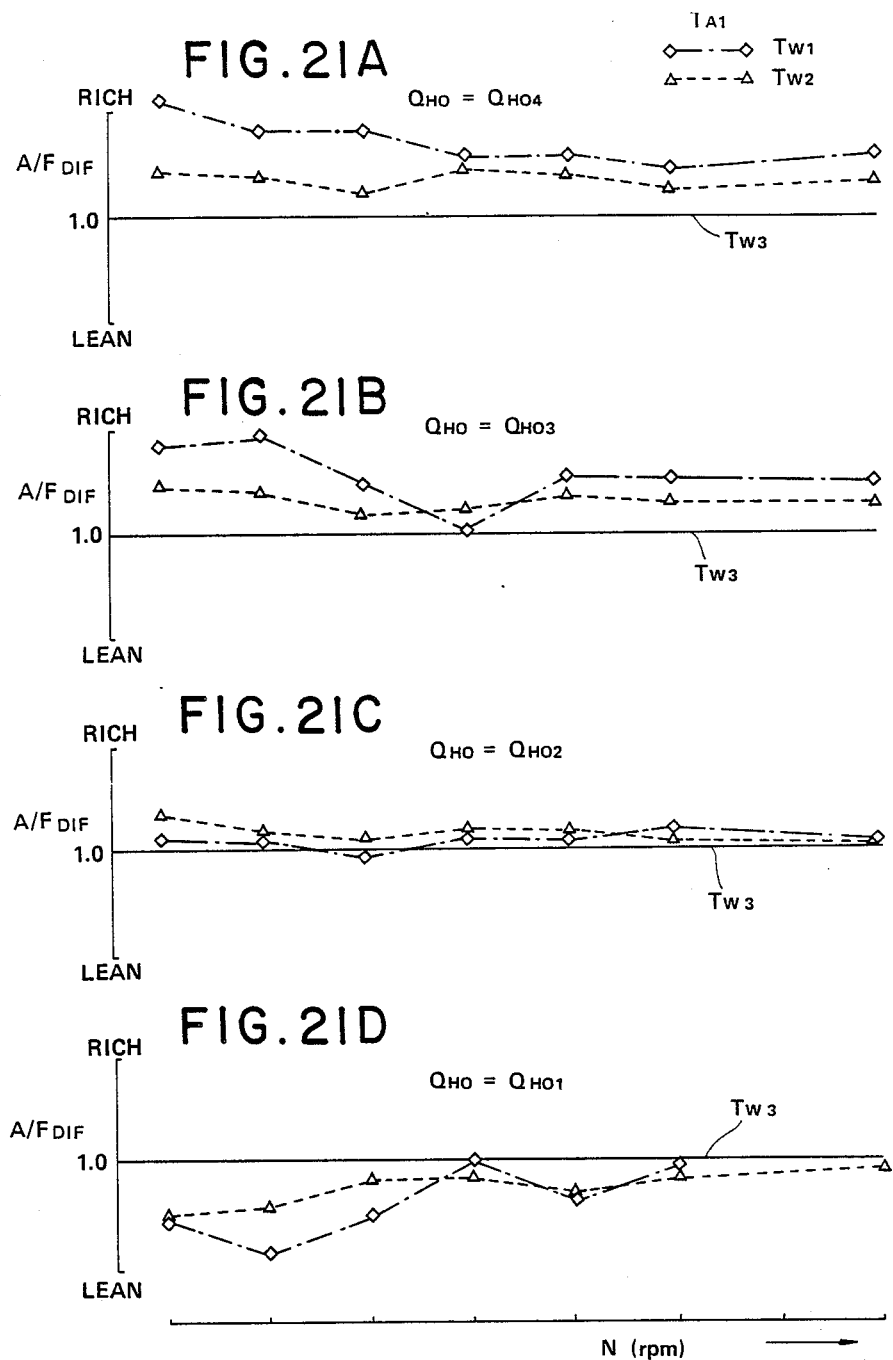

SYSTEM FOR MEASURING AMOUNT OF AIR INTRODUCED INTO COMBUSTION CHAMBER OF INTERNAL COMBUSTION ENGINE WITH AVOIDING INFLUENCE OF TEMPERATURE DEPENDENT AIR DENSITY VARIATION AND PULSATILE AIR FLOW

BACKGROUND OF THE INVENTION

1. Field of the Invention

The present invention relates generally to a system for measuring an intake air amount to be introduced into an engine combustion chamber. More specifically, the invention relates to an intake air amount measuring system which can derive an intake air amount to be introduced into an engine combustion chamber with high precision and which system is suitable to be coupled with a high precision engine control systems for providing precise intake air amount data.

2. Description of the Background Art

In an electronic or electric engine control systems, such as a fuel injection system, idling control system and so forth, for controlling engine operation for optimizing the engine performance, amount of air to be introduced into an engine combustion chamber is regarded as one of the essential parameters. Conventionally, the intake air amount has been measured by means of air flow meters, such as flap type air flow meter, hot wire type air flow meter, Karman vortex type air flow meter and so forth. In the alternative, the air flow amount can also measured by measuring a vacuum pressure in an air induction system.

Such conventional techniques in measurement of intake air amount tends to be influenced by pulsatile air flow through the air induction system. Therefore, such conventional techniques are not as precise as that required for high precision engine control which has been required nowadays.

In this view, there has been proposed a new technology for measuring intake air amount based on a throttle valve angular position which represents air flow path area in the induction system, and an engine speed. Such new technology has been proposed in the Japanese Utility Model Second (examined) Publication (Jikko) Showa 60-39465. In the disclosed system, intake air volume is arithmetically derived on the basis of the throttle valve angular position and the engine speed and intake air weight is derived on the basis of the intake air volume and intake air density which is variable depending upon the temperature of the intake air. In order to monitor the intake air temperature, an intake air temperature sensor is disposed in the air induction system upstream of a throttle valve. The disclosed system derives the air density on the basis of the intake air temperature monitored by the intake air temperature sensor. This may achieve substantial improvement in precision of measurement of an intake air amount.

However, this system does not concern about variation of the air density caused downstream of the sensor due to temperature variation caused by various factors. For example, in some of the air induction system, the intake air is heated by means of an engine coolant recirculated from the engine cooling chamber for obtaining better fuel atomization characteristics. In such case, the intake air temperature at downstream of the intake air temperature sensor becomes higher than that measured to cause lowering of the intake air density. Alternatively, because of adiabatic expansion of the intake air is caused at the throttle valve, the intake air temperature tends to be lowered to increase the intake air density. In addition, in case of a single-point injection system, fuel is injected into the air induction system upstream of the throttle valve so that the injected fuel can be atomized utilizing the jet flow through the throttle valve. Atomization of the fuel naturally lower the temperature of the intake air to cause increasing of the air density.

Therefore, when the intake air amount as monitored by the intake air measuring system as disclosed in the aforementioned Tokko Showa 60-39465, the intake air amount data to be used for engine control, such as fuel injection control, spark ignition timing control and so forth, cannot precisely correspond to that actually introduced into the engine combustion chamber. As a result, the engine control to be performed with taking the intake air amount data derived in the prior proposed process, cannot be satisfactorily precise as that required in nowadays.

SUMMARY OF THE INVENTION

Therefore, it is an object of the present invention to provide an intake air amount measuring system which can provide intake air amount data as precise as that required in nowadays high precision engine control systems.

In order to accomplish aforementioned and other objects, an intake air amount measuring system, according to the invention, measures intake air amount to be introduced into an engine cylinder. The system employs a throttle angle sensor as a basic intake air flow amount indicative factor. Basic intake air flow amount is derived on the basis of a throttle vale angular position and an engine speed. The basic intake air flow amount is corrected with taking delay factor to introduce the intake air past the throttle valve into the engine cylinder, and a temperature dependent factor compensating variation of air density depending upon the temperature condition.

According to one aspect of the invention, a system for detecting intake air flow amount in an internal combustion engine, comprises a first means for monitoring an engine revolution speed to produce an engine speed indicative first signal, a second means for deriving a basic engine load indicative data on the basis of an air induction passage of the internal combustion engine and the first signal value, the second means producing a second signal indicative of the basic engine load, a third means for deriving a delay factor for introducing intake air into an engine cylinder on the basis of the first and second signal values, and deriving a time dependent first correction value for correcting the basic engine load indicative data on the basis of the delay factor, and a fourth means for modifying the second signal value on the basis of the first correction value and outputting a modified second signal as the intake air amount indicative signal indicative of the intake air amount.

According to another aspect of the invention, a system for detecting intake air flow amount in an internal combustion engine, comprises a first means for monitoring an engine revolution speed to produce an engine speed indicative first signal, a second means for deriving a basic engine load indicative data on the basis of an air induction passage of the internal combustion engine and the first signal value, the second means producing a second signal indicative of the basic engine load, a third means for monitoring a preselected engine driving parameter affecting density of intake air to produce a third signal, a fourth means for deriving a delay factor for introducing intake air into an engine cylinder on the basis of the first and second signal values, and deriving a time dependent first correction value for correcting the basic engine load indicative data on the basis of the delay factor, a fifth means for deriving an air density dependent second correction value for correcting the basic engine load indicative data on the basis of the third signal, and a sixth means for modifying the second signal value on the basis of the first and second correction values and outputting a modified second signal as the intake air amount indicative signal indicative of the intake air amount.

In the preferred embodiment, the second means includes a throttle angle sensor for monitoring a throttle angle position to produce a throttle angle signal as a data representative of path area of the intake air passage.

The fourth means may derive the delay factor which is a coefficient depending upon lag time of introduction into the engine cylinder from a position of the throttle valve to the engine cylinder.

In the preferred construction, the third means includes at least one of an intake air temperature sensor for producing an intake air temperature indicative signal as the intake air density affecting parameter, and an engine coolant temperature sensor for producing an engine coolant temperature indicative signal as the intake air density affecting parameter. In the former case, the fifth means derives the second correction value on the basis of the intake air temperature indicative signal. It is preferable to employ both of the intake air temperature sensor and an engine coolant temperature sensor. In this case, the fifth means modifies the second correction value derived based on the intake temperature indicative signal based on the engine coolant temperature indicative signal value. Furthermore, the fifth means also modifies the second correction value with a value derived on the basis of the first signal value.

In the practical operation for correcting the second signal value is performed by varying magnitude of modification of the second correction value on the basis of the engine coolant indicative signal value, depending upon the first signal value. Preferably, the fifth means further varies magnitude of modification of the second correction value derived on the basis of the engine coolant temperature indicative signal value depending upon the second signal value.

In the preferred construction, the intake air temperature sensor is disposed within the intake air passage at a position upstream of the throttle valve.

BRIEF DESCRIPTION OF THE DRAWINGS

In the drawings:

FIGS. 21(A), 21(B), 21(C) and 21(D) are illustration showing variation of air/fuel ratio relative to engine speed when the intake air temperature $T_A$, the engine coolant temperature Tw and the engine load are constant.

DESCRIPTION OF THE PREFERRED EMBODIMENT

Figure 1:
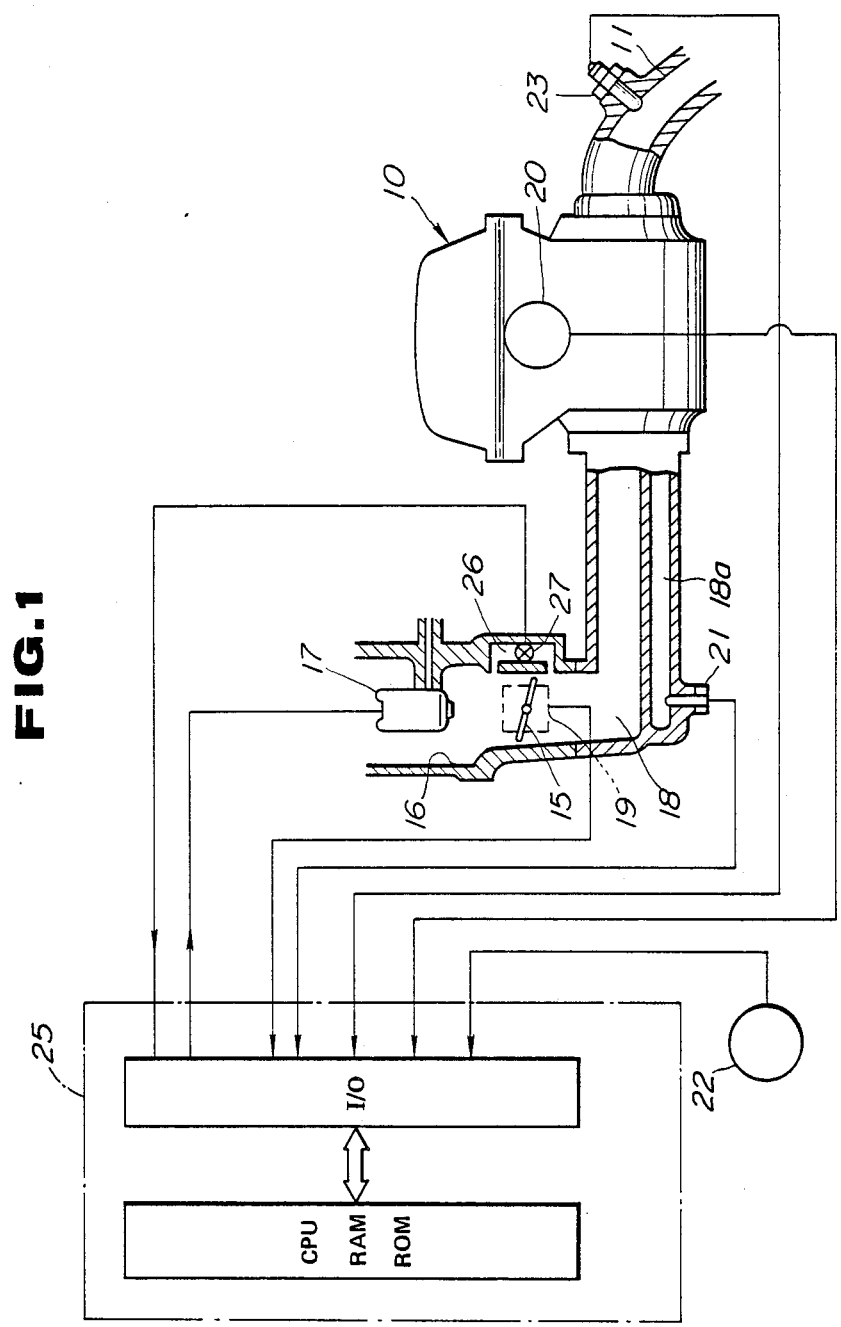
FIG. 1 is a schematic or fragmentary block diagram of a single-point fuel injection type internal combustion engine with a fuel injection control system as an example of an engine control system, to which the preferred embodiment of an intake air amount measuring system, according to the invention is applied.
Figure 2:
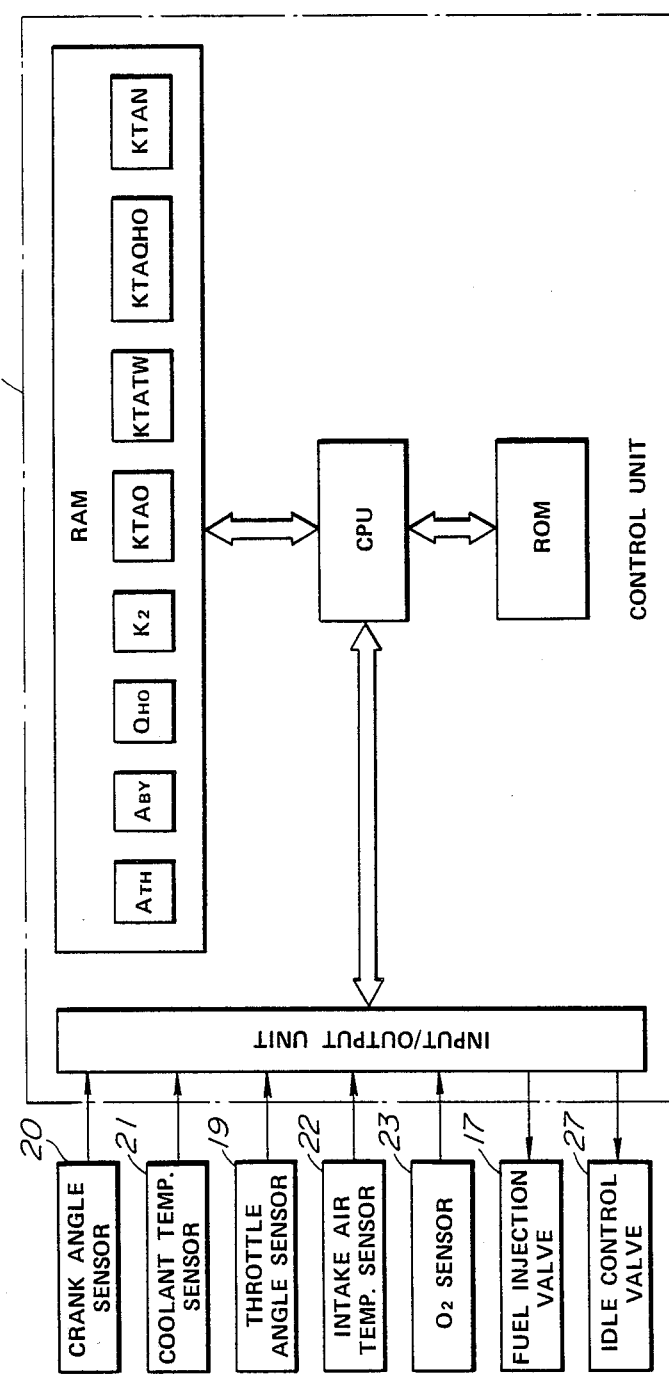
FIG. 2 is a block diagram of a control unit in the preferred embodiment of the fuel injection system associated with the preferred embodiment of the intake air amount measuring system of FIG. 1, which control unit serves both for controlling fuel injection and for deriving an intake air flow amount.

Referring now to the drawings, particularly to FIGS. 1 and 2, the preferred embodiment of an intake air amount measuring system, according to the present invention, will be disclosed in terms that it is applied to a single-point fuel injection type internal combustion engine as illustrated in FIG. 1. The shown engine is associated with a fuel injection control system with an air/fuel ratio control.

The shown type internal combustion engine has an air induction system which defines an intake air flow passage 16, in which a throttle valve 15 is disposed in a throttle body provided at the intermediate position between an air inlet (not shown) and an intake port of an engine cylinder defined in an engine block 10. As is well known, the throttle valve 15 is associated with a manually operable accelerator (not shown) such as an accelerator pedal, to be rotatingly driven for varying an angular position and whereby varying an intake air flow path area. A fuel injection valve 17 is disposed within the intake flow passage 16 at an orientation upstream of the throttle valve 15. The fuel injection valve 17 is so designed as to inject a controlled amount of fuel into air flowing through the throttle body where the throttle valve 15 is disposed. Since the throttle valve 15 limits air flow rate flowing therethrough, the flow velocity of the air at the throttle body becomes higher than that in other sections of the induction system by jet effect. Furthermore, part of the intake air collides onto the throttle valve to generate a swirl therearound. These jet effect and swirl generated around the throttle valve 15 will assist atomization of the injected fuel and mixing of the atomized fuel with intake air for forming uniform mixture ratio of air/fuel mixture.

An intake manifold 18 is interposed between the throttle body and the intake port of the engine cylinders in order to distribute the air/fuel mixture to each of the engine cylinders through its branch passages. The intake manifold 18 is formed with an engine coolant passage 18a for introducing an engine coolant recirculated from an engine coolant chamber or cooling water jacket (not shown) defined in the engine block. This arrangement of the engine coolant chamber in the intake manifold 18 is intended to heat the air/fuel mixture to be introduced into the engine cylinder for better combustion characteristics and better frame propagration in a combustion chamber.

A throttle angle sensor 19 is associated with the throttle valve 15. The throttle angle sensor 19 comprises a potentiometer variable of output voltage depending upon the angular position of the throttle valve. The output voltage of the throttle angle sensor 19 serves as "throttle angle indicative signal $\theta_{th}$". A crank angle sensor 20 is also provided for monitoring a crank shaft angular displacement and for detecting the crank shaft at a specific angular positions, e.g. 70° or 66° before top-dead-center (BTDC) of one of engine cylinder in compression stroke. The crank angle sensor 20 is so designed as to produce a crank reference signal $\theta_{ref}$ every time the crank shaft at the specific angular position is detected and a crank position signal $\theta_{pos}$ at every predetermined angle, e.g. 2° of crank shaft angular displacement.

The shown system is further provided with an engine coolant temperature sensor 21 which is disposed within the engine coolant chamber 18a defined in the intake manifold 18 and designed to monitors an engine coolant temperature Tw to produce an engine coolant temperature indicative signal. Though the shown embodiment employs the engine coolant temperature sensor 21 disposed within the engine coolant chamber 18a of the intake manifold, it may possible to utilize the engine coolant temperature data as monitored by an engine coolant temperature sensor disposed within the cooling water jacket in the engine block as the equivalent data, since the temperature transfer coefficient of the engine coolant is relatively smaller than that of the intake air and therefore the temperature drop of the engine coolant to the engine coolant chamber 18 from that in the engine block can be disregarded. The show system is also provided with an intake air temperature sensor 22 which is disposed within the air induction system at a position upstream of the throttle body and monitors intake air temperature $T_A$. An oxygen ($O_2$) sensor 23 is disposed within an exhaust passage 11 of the engine for monitoring oxygen concentration contained in an exhaust gas and whereby monitors rich and lean of the air/fuel mixture combustioned in the combustion chambers. The $O_2$ sensor thus produces an $O_2$ sensor signal LAMBDA having a value variable depending upon the oxygen concentration monitored in the exhaust gas.

The throttle angle indicative signal $\theta_{th}$, the crank reference signal $\theta_{ref}$, the crank position signal $\theta_{pos}$, the engine coolant temperature indicative signal Tw, the intake air temperature indicative signal $T_A$ and the $O_2$ sensor signal LAMBDA are fed to a microprocessor which serves as a control unit 25. The control unit 25 derives a fuel injection amount Ti on the basis of the control parameters obtained from the aforementioned sensor signals for controlling fuel injection amount to be injected through the fuel injection valve 17. The control unit 25 is also connected to an idling speed control valve 27 disposed in a by-pass passage 26 by-passing the throttle valve 15 for introducing controlled amount of intake air into the combustion chamber therethrough. The idling speed control valve 27 includes an electromagnetic actuator driving the valve between open and close positions cyclically according to duty cycle of an idling speed control signal produced by the control unit.

As shown in FIG. 2, the control unit 25 comprises an input/output interface 30, CPU 31, ROM 32 and RAM 33. ROM 32 stores a various control programs including a fuel injection control program, an idling air control program, an intake air measuring program and so forth. ROM 32 may also store permanent values to be used during execution of control programs. The control unit may perform the control programs in time-sharing basis as governed by a main control program which is executed as background job. ROM 32 further stores various tables to be utilized in derivation of the intake air amount, detailed discussion of respective tables will be given later. RAM 33 may be provided a plurality of memory blocks for storing input data, intermediate data and so forth to be used in control operation and derivation of the intake air flow amount. Detail of the content in ROM 32 and RAM 33 will be discussed later with discussion of the process illustrated in FIGS. 3 to 21.

Figure 3:
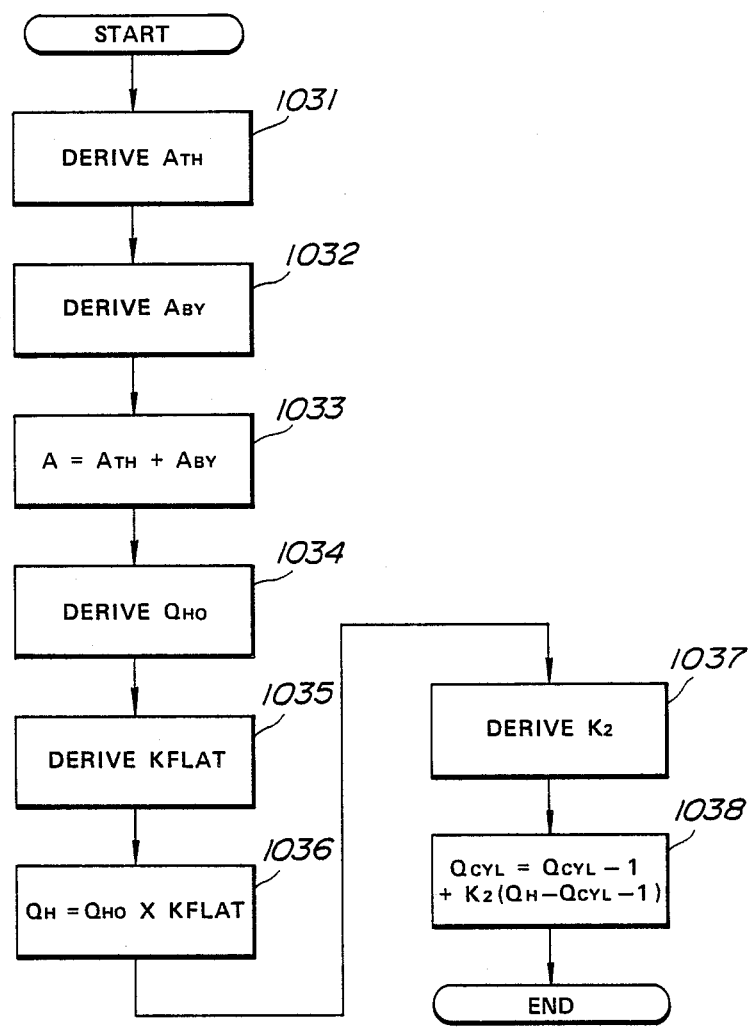
FIG. 3 is a flowchart showing a routine for deriving an intake air volume $Q_{CYL}$ to be introduced into an engine combustion chamber.

FIG. 3 shows a flowchart of a routine for deriving an intake air volume $Q_{CYL}$ to be introduced into the engine cylinder. Basically, the shown embodiment is designed to derive the intake air volume $Q_{CYL}$ on the basis of the throttle angle indicative signal $\theta_{th}$ and an engine speed data N. In practice, the engine speed data N is derived on the basis of the crank reference signal $\theta_{ref}$ or the crank position signal $\theta_{pos}$. Namely, in case that the engine speed data N is derived on the basis of a frequency of the crank position signal $\theta_{pos}$, the crank position signals $\theta_{pos}$ is counted within a predetermined period. For this purpose, an engine speed counter (not shown) may be provided in the input/output unit. The engine speed counter may be triggered at the initial stage of process for deriving the engine speed data N. At the same time, an engine speed timer (not shown) is also triggered to measure the predetermined period. When the timer value of the engine speed timer reaches a given value corresponding to the predetermined period, the counter value of the engine counter is latched. The latched counter value is processed to derive the engine speed data N. The process for deriving the engine speed data N based on the count of the crank position signal $\theta_{pos}$ is well known technique and require no detailed discussion.

In the alternative, the engine speed data N can be obtained by measuring an interval of occurrences of the crank reference signals $\theta_{ref}$. Namely, the period of the pulse form crank reference signal $\theta_{ref}$ is inversely proportional to the engine speed, the engine speed data can be obtained by obtaining reciprocal of the pulse period of the crank reference signal $\theta_{ref}$. This procedure in derivation of the engine speed data N may be preferred when the economical system rather than high precision is required.

The routine shown in FIG. 3 may be triggered with a predetermined interval, e.g. 20 ms to update the intake air volume data $Q_{CYL}$. Immediately after starting execution, a table shown in FIG. 7 to be used for deriving a path area $A_{th}$ variable depending upon the throttle valve open angle in terms of the throttle angle indicative signal $\theta_{th}$, which table is stored in ROM 32 and will be hereafter referred to as "$A_{th}$ table", is accessed at a step 1031. The path area $A_{th}$ at the throttle valve 15 to flow the intake air will be hereafter referred to as "throttle valve path area". As will seen from FIG. 7, the throttle valve path area $A_{th}$ is thus derived by looking-up the $A_{th}$ table, at the step 1031. At a step 1032, the idling air control signal ISCD which is pulse signal having duty cycle defining open and close period of the idling speed control valve 27. The path area $A_{BY}$ as defined by the ratio of open period relative to the closed period, is set in a table of FIG. 8, which table will be hereafter referred to as "$A_{BY}$ table". Similarly to the throttle valve path area $A_{th}$, the $A_{BY}$ table is looked up in terms of the idling speed control signal ISCD to derive the path area $A_{BY}$ in the by-pass passage 26. The path area derived at the step 1032 will be hereafter referred to as "by-pass passage path area".

At a step 1033, a total intake air path area A is calculated by adding the by-pass passage path area $A_{BY}$ to the throttle valve path area $A_{th}$. Based on the total intake air path area A as derived at the step 1033, a ratio of the total intake air path area A versus the engine speed N is calculated at a step 1034. The ratio of the total intake air path area A versus the engine speed N will be hereafter referred to as A/N ratio. At the step 1034, table look up is performed against a table of FIG. 9 to derive a linearized intake air flow amount $Q_{HO}$ in terms of the A/N ratio. The linearized air flow amount $Q_{HO}$ represents basic intake air volume in steady or stable engine driving condition. The table illustrated in FIG. 9 storing the linearized intake air flow amount $Q_{HO}$ in terms of the A/N ratio will be hereafter referred to as "$Q_{HO}$ table".

It should be noted that though the shown embodiment derives the linealized air flow amount $Q_{HO}$ based on the A/N ratio, it may be possible to utilize a A/(N×V) ratio with taking the volume V of the engine cylinder.

Then, based on the linearized intake air flow amount $Q_{HO}$ derived at the step 1034 and the engine speed N, an intake air volume correction coefficient KFLAT is derived, which correction coefficient KFLAT will be hereafter referred to as "KFLAT value". The KFLAT value is stored in ROM 32 in a form of a table shown in FIG. 10, which table will be hereafter referred to as "KFLAT table". This KFLAT table is looked up in terms of the linearized intake air flow amount $Q_{HO}$ and the engine speed N to derive the KFLAT value. This KFLAT value is introduced in derivation of the intake air flow amount as a correction factor for obtaining constant air/fuel ratio, e.g. stoichiometric value of air/fuel ratio by compensating possible deviation of the actual air/fuel ratio and the stoichiometric value caused by maintaining air/fuel ratio control based on the linearized air flow amount $Q_{HO}$.

Figure 11:
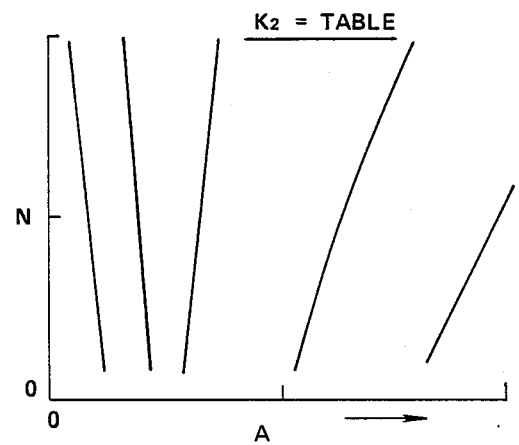
FIG. 11 is an illustration of a three-dimensional table for deriving a delay dependent coefficient $K_2$ to be looked up in terms of the engine speed N and the total air flow path area A.
Figure 12:
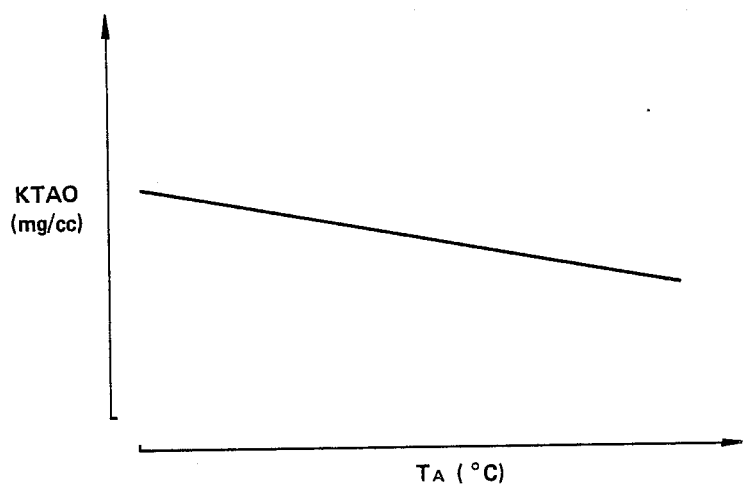
FIG. 12 is an illustration of a two-dimensional table for deriving a basic intake air temperature dependent correction coefficient KTAO to be looked up in terms of an intake air temperature $T_A$.
Figure 13:
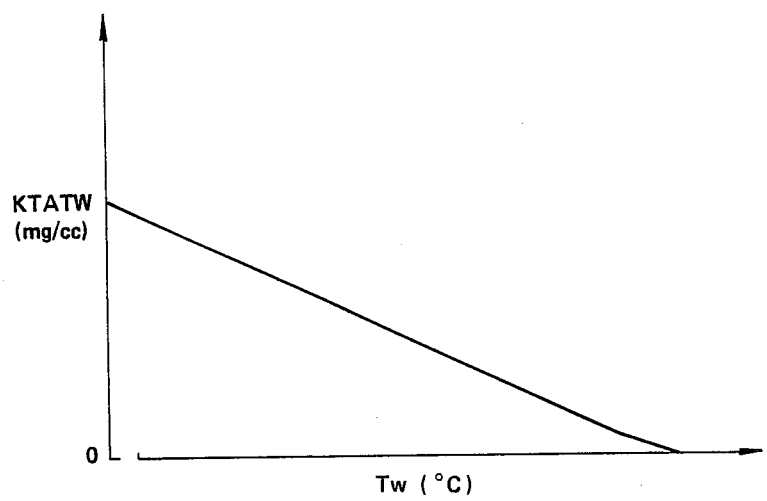
FIG. 13 is an illustration a two-dimensional table for deriving an engine coolant temperature dependent correction coefficient KTATW to be looked up in terms of an engine coolant temperature Tw.
Figure 14:
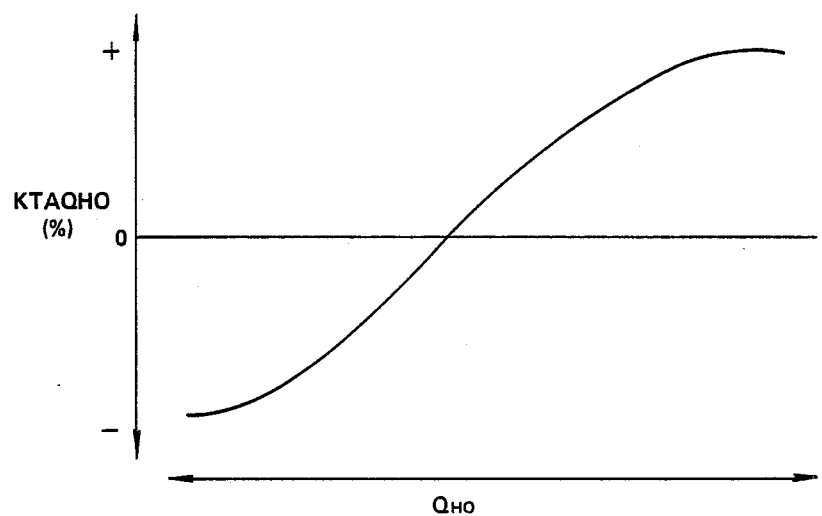
FIG. 14 is an illustration showing a two-dimensional table for deriving an engine load dependent value KTAQHO to be looked up in terms of the linearized intake air flow amount $Q_{HO}$.
Figure 15:
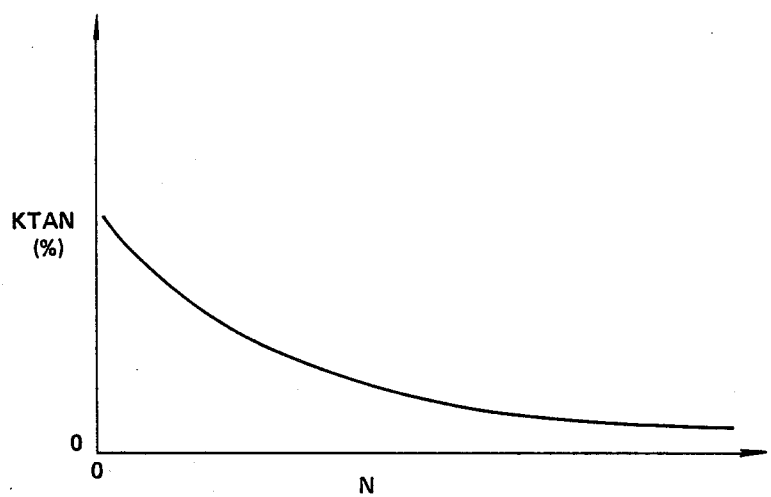
FIG. 15 is an illustration showing a two-dimensional table for deriving an engine speed dependent value KTAN to be looked up in terms of the engine speed N.
Figure 16:
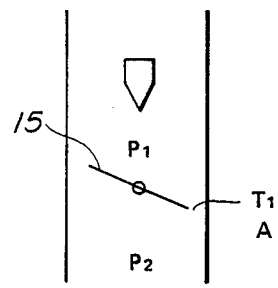
FIGS. 16(A) and 16(B) are illustration showing part of the air induction system for showing position of the parameters for arithmetic operation of derivation of intake air weight.
Figure 16:
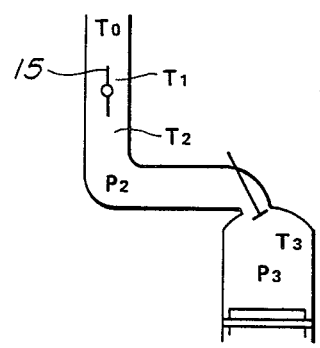

Based on the linearized intake air flow amount $Q_{HO}$ derived at the step 1034 and the KFLAT value derived at the step 1035, a steady state air flow amount $Q_H$ is derived by modifying the linealized air flow amount $Q_{HO}$ by the KFLAT value, at a step 1036. Thereafter, at a step 1037, a delay time based correction coefficient $K_2$ is derived on the basis of the total intake air path area A and the engine speed N. The delay time based correction coefficient $K_2$ is set in view of the delay time of introduction of the air past the throttle valve 15 into the engine cylinder. This delay time based correction coefficient $K_2$ is set in a three-dimensional table stored in ROM 32 and is deigned to be looked up in terms of the total air flow path area A and the engine speed N, as shown in FIG. 11. In case the that the (A/(N×V)) is used for deriving the linearized air flow amount $Q_{HO}$, the parameters to be used for deriving the delay time based correction coefficient $K_2$ becomes A and (N×V).

At a step 1038, the intake air volume $Q_{CYL}$ is derived from the following equation:

$$Q_{CYL} = Q_{CYL-1} + K_2(Q_H - Q_{CYL-1})$$

where $Q_{CYL-1}$ is the intake air volume derived in the immediately preceding execution cycle of the routine of FIG. 3. During the engine is driven in steady state, the $Q_{CLY-1}$ becomes nearly equal or equal to the intake air amount $Q_H$ as derived at the step 1036.

The process of derivation of the intake air volume $Q_{CYL}$ based on the throttle valve angular position $\theta_{th}$ and the engine speed N has been disclosed in the aforementioned Tokko 60-39465. The disclosure of this reference will be herein incorporated by reference for the sake of disclosure.

As will be appreciated, since the throttle valve angular position $\theta_{th}$ and the engine speed N are free from influence of pulsatile flow of the intake air, the intake air volume $Q_{CYL}$ derived through the foregoing process can be precise with avoiding the influence of the pulsatile flow of the air.

In case of a multi-point injection type fuel injection internal combustion engine, the intake air volume $Q_{CYL}$ as derived through the process set forth above, can represents the intake air amount at the position where fuel injection is performed. However, in case of the single-point injection type fuel injection internal combustion engine, intake air flow amount $Q_{AINJ}$ at the position of the fuel injection valve 17 tends to be different from the intake air volume $Q_{CYL}$ at the intake port of the engine cylinder. The deviation between $Q_{AINJ}$ and $Q_{CYL}$ becomes substantially in the engine transition state where pressure variation occurs in the air induction passage.

Figure 4:
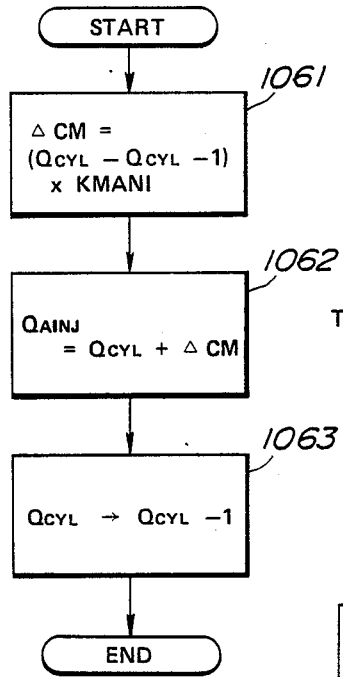
FIG. 4 is a flowchart showing a routine for deriving an intake air amount $Q_{AINJ}$ at a portion of an air induction system, to which a controlled amount of fuel is to be injected.

In order to compensate this deviation between $Q_{AINJ}$ and $Q_{CYL}$, the control unit 25 executes a deviation compensating routine of FIG. 4. Through the process of FIG. 4, the intake air flow amount $Q_{AINJ}$ at the fuel injection point can be derived in precise fashion. The intake air amount $Q_{AINJ}$ will be hereafter referred to as "injection point air amount".

At a step 1061, a correction value CM is derived according to the following equation:
$$CM = (Q_{CYL} - Q_{CYL-1}) \times KMANI$$
where KMANI is a given constant value determined corresponding to volume of the intake air flow path. This correction value CM compensate loss of air volume in the air flow path between the fuel injection valve and the intake port. Therefore, at a 1062, the injection point air amount $Q_{AINJ}$ is calculated by adding the correction value CM to the intake air volume $Q_{CYL}$ derived at the step 1038. Thereafter, the intake air volume $Q_{CYL}$ is registered as $Q_{CYL-1}$ data for the next execution cycle.

In the process set forth above, since the intake air amount $Q_H$ is derived with taking the delay of introduction of the intake air into the engine cylinder by utilizing the delay time based correction coefficient $K_2$, the obtained intake air volume $Q_{CYL}$ or the injection point air amount $Q_{AINJ}$ can be precise enough to allow high precision engine control.

Figure 5:
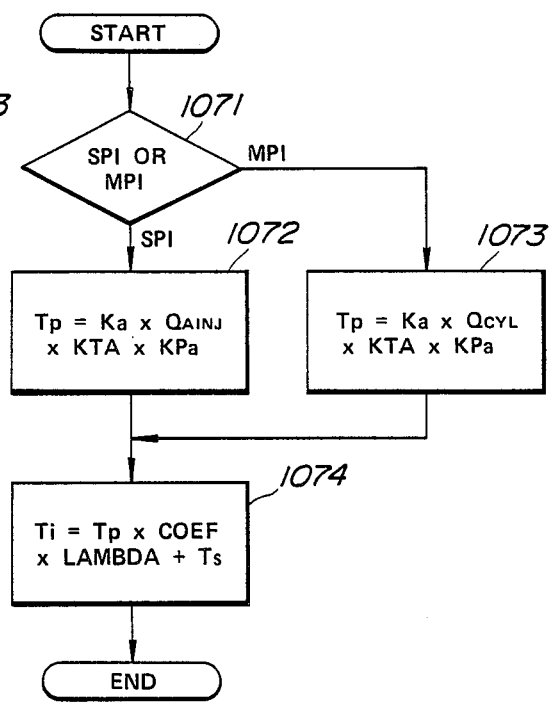
FIG. 5 is a flowchart showing a routine for deriving a fuel injection amount Ti.

Example of use of the intake air amount $Q_{CYL}$ or the injection point air amount $Q_{AINJ}$ will be discussed herebelow in terms of the fuel injection control with air/fuel ratio control. FIG. 5 shows a process for deriving the fuel injection amount in the fuel injection control. As will be appreciated from FIG. 5, the shown routine is designed to be adapted both for single-point injection type and multi-point injection type engines. In case of the single-point injection type internal combustion engine, the injection point air amount $Q_{AINJ}$ is used as engine load indicative feature. However, as seen from the preceding discussion, since the injection point air amount $Q_{AINJ}$ is determined with taking the engine speed N as a feature, the engine speed parameter is not need to be taken into account for deriving the fuel injection amount in case that the injection point air amount $Q_{AINJ}$ is used as engine load indicative parameter. On the other hand, in case of the multi-point injection type internal combustion engine, the intake air volume $Q_{CYL}$ is used. Similarly to the injection point air amount $Q_{AINJ}$, since the intake air volume point air amount $Q_{CYL}$ is determined with taking the engine speed N as a feature, the engine speed parameter is not needed to be taken into account for deriving the fuel injection amount in case that the injection point air amount $Q_{AINJ}$ is used as engine load indicative parameter.

In the process of the routine of FIG. 5, the engine type is at first discriminated whether the engine is single-point injection type or the multi-point injection type, at a step 1071. When the engine type as discriminated at the step 1071 is a single-point injection type engine, a basic fuel injection amount Tp is calculated at a step 1072 by utilizing the following equation:

$$Tp = Ka \times Q_{AINJ} \times KAT \times KPa \quad (1)$$

where
Ka is a constant value determined depending upon characteristics of the fuel injection valve 17;
KTA is an air temperature dependent correction coefficient, which introduces correction factor of depending upon an air density; and
KPa is a correction value determined on the basis of an ambient air pressure.

On the other hand, when the engine type is multi-point injection type engine as checked at the step 1071, the basic fuel injection amount Tp is calculated at a step 1073, by the following equation:

$$Tp = Ka \times Q_{CYL} \times KTA \times KPa \; Tm \quad (2)$$

As is well known, the basic fuel injection amount Tp is then corrected by a various correction factors, such as engine driving condition dependent correction coefficient COEF which is composed of various correction factors, such as cold engine enrichment factor, an acceleration enrichment factor, engine start-up enrichment factor and so forth, a air/fuel ratio dependent feedback correction factor LAMBDA as derived on the basis of the $O_2$ sensor signal value, a battery voltage dependent correction factor Ts and so forth. In practice, the fuel injection amount Ti is derived at a step 1074, by utilizing per se well known equation:

$$Ti = Tp \times COEF \times LAMBDA + Ts \quad (3)$$

Here, by introducing the air temperature dependent correction coefficient KTA, intake air weight can be derived from the intake air volume $Q_{CYL}$ or the injection point air amount $Q_{AINJ}$. Furthermore, since the air density is influenced by the ambient air pressure, the ambient air pressure dependent correction value KPa is also used for deriving the intake air weight.

In derivation of the air temperature dependent correction coefficient KTA, it is insufficient to derive the correction coefficient based on the intake air temperature as monitored by the intake air temperature sensor 22, since the air density tends to vary at the position in the induction system downstream of the intake air temperature sensor as set forth above.

In general, the intake air weight G can be illustrated by the following equations depending on the engine driving condition.

When the engine is in a state where the throttle valve open angle serves as a major factor, the intake air weight G can be illustrated by:

$$G = C \times A_{th} \times P_1 \times \{2k/(k-1)RT_1\}^{-2} \times \quad (4)$$
$$\{(P_2/P_1)^{2/k} - (P_2/P_1)^{(k+1)/k}\}^{-2}$$

where
C is a predetermined coefficient;
$P_1$ is a pressure at upstream of the throttle valve, as shown in FIG. 16(A);
$P_2$ is a pressure at downstream of the throttle valve, as shown in FIG. 16(A);
$T_1$ is an intake air temperature at the throttle valve
k is a specific heat ratio;

R is a gas constant

On the other hand, when the engine is in a state where the engine capacity serves as major factor, the intake air weight can be illustrated by:

$$G = EF \times (P_3/760) \times \{273/(273+T_3)\} \times Ds \times Vc \times (2-N/60) \quad (5)$$

where
EF is charging efficiency;
$P_3$ is an intake air pressure in the engine cylinder which is equal to the pressure $P_2$ in the intake manifold, as shown in FIG. 16(b);
Ds is a density of air at the temperature of 0° C.;
Vc is a capacity of each engine cylinder;
$T_2$ is an intake air temperature at the intake manifold.

From the foregoing equations, the followings are the factor influencing to the intake air weight:

(i) variation of the throttle valve path area $A_{th}$ caused by difference of thermal expansion between the throttle body and the throttle valve;

(ii) increase of air density in the intake manifold due to temperature drop from $T_1$ to $T_2$ caused by adiabatic expansion of the air passing through the throttle valve, in which the temperature drop dT ($T_1-T_2$) can be illustrated by:

$$dT = v^2/J \times 2g \times C_{pa}) \quad (3)$$

where
1/J is caloric value,
g is gravitational acceleration,
$C_{pa}$ is specific heat of air, and
v is air flow velocity;

(iii) increase of air density due to air temperature drop caused by atomization of the fuel injected at the position upstream of the throttle valve, which temperature drop $dT_2$ can be illustrated by:

$$dT_2 = X \times L/(A/F \times C_{pa} \times C_{pf})$$

where
x is atomization rate of the fuel,
L is vaporization heat of the fuel,
A/F is air/fuel ratio, and
$C_{pf}$ is specific heat of the fuel (iv) decrease of the air density due to heating of the intake air in the intake manifold and in the combustion chamber by the engine coolant;

(v) variation of the throttle valve path area $A_{th}$ caused due to variation of viscosity of fuel adhering on the throttle valve and inner periphery of the throttle body.

Figure 17A:
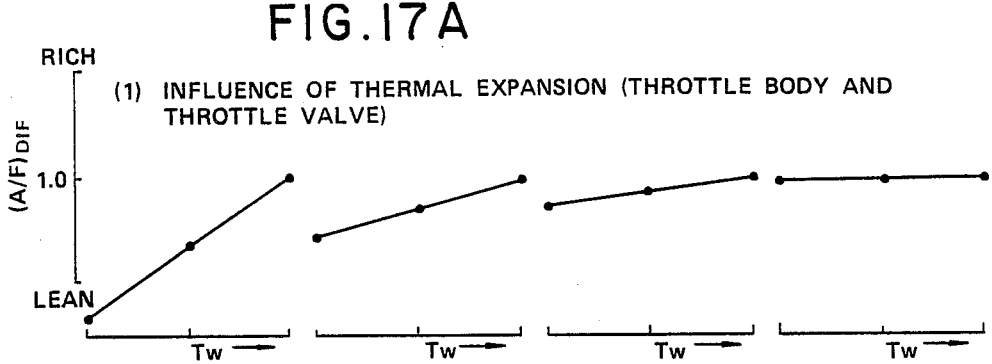
FIGS. 17(A), 17(B), 17(C) and 17(D) are illustration showing influences of environmental condition affecting air/fuel ratio.
Figure 17B:
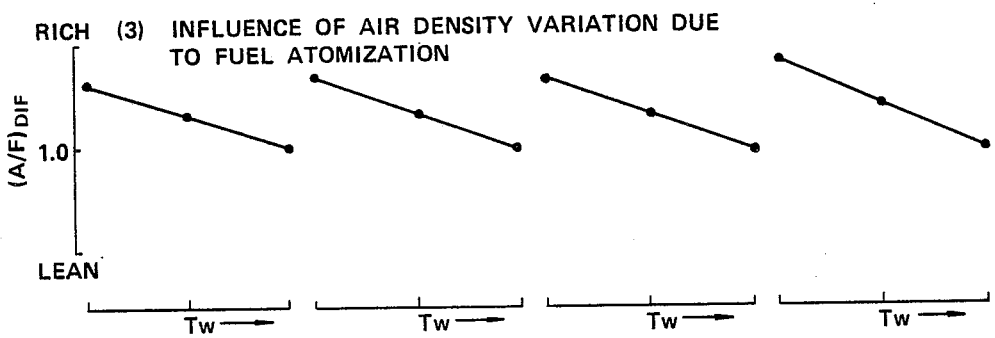
Figure 17C:
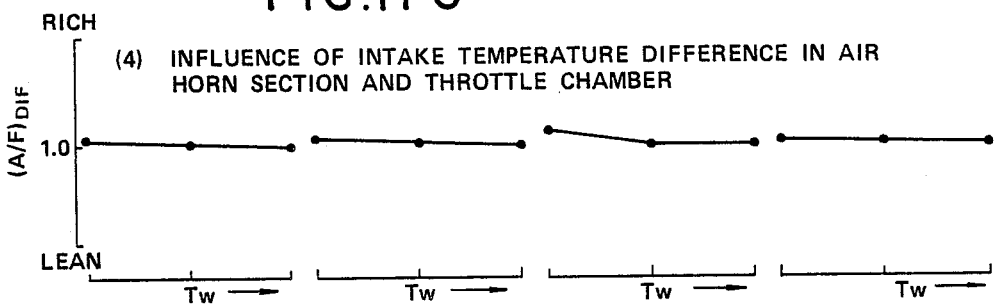
Figure 17D:
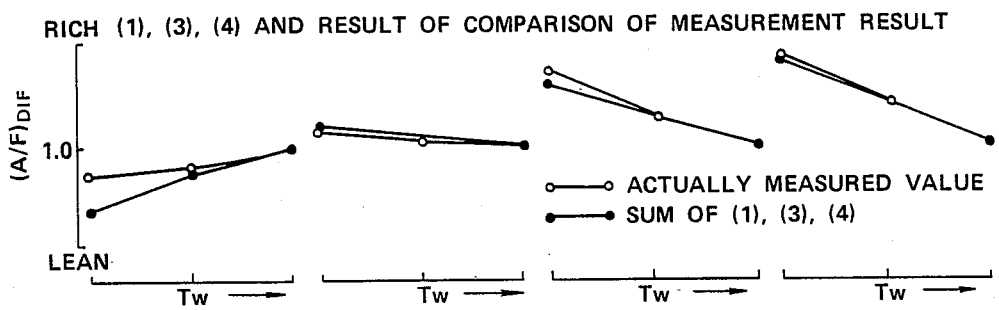
Figure 18A:
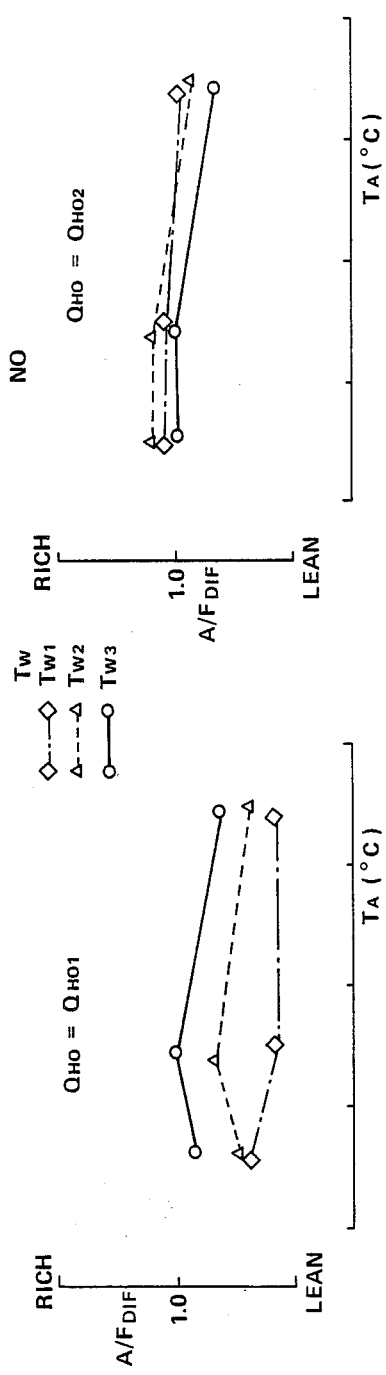
FIGS. 18(A), 18(B), 18(C) and 18(D) are illustration of arithmetically obtained and actually measured air/fuel ratio at various linearized intake air flow amounts corresponding to influencing factors of FIGS. 17(A), 17(B), 17(C) and 17(D)
Figure 18B:
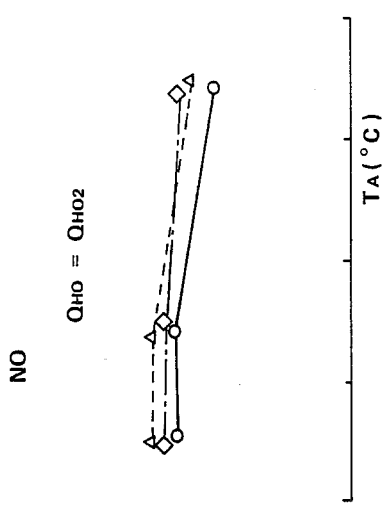
Figure 18C:
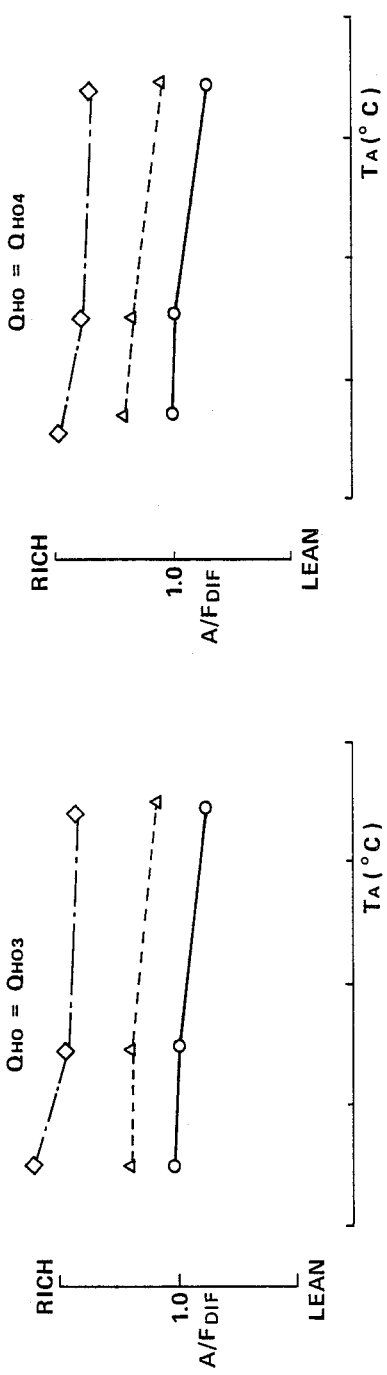
Figure 18D:
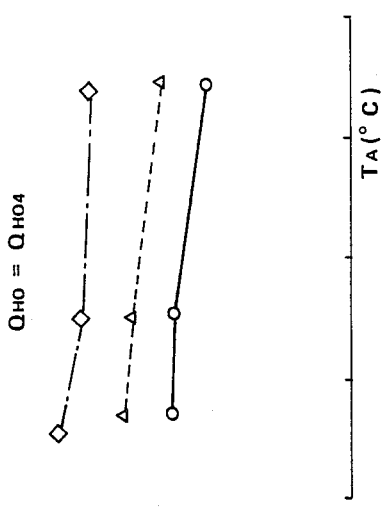
Figure 19C:
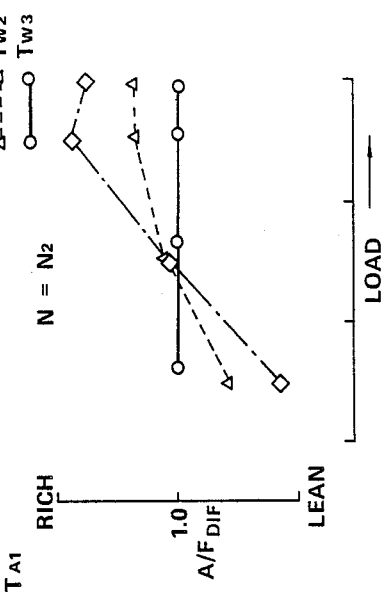
FIGS. 19(A), 19(B), 19(C) and 19(D) are illustration of arithmetically obtained and actually measured air/fuel ratio at various engine speed corresponding to influencing factors of FIGS. 17(A), 17(B), 17(C) and 17(D)
Figure 19D:
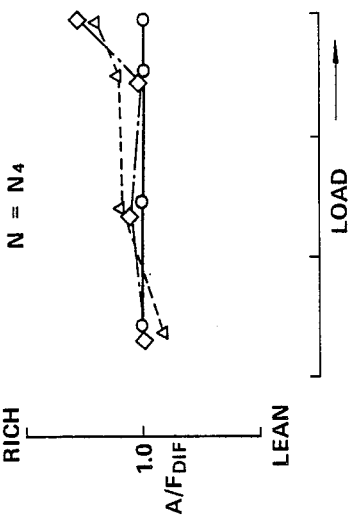
Figure 19A:
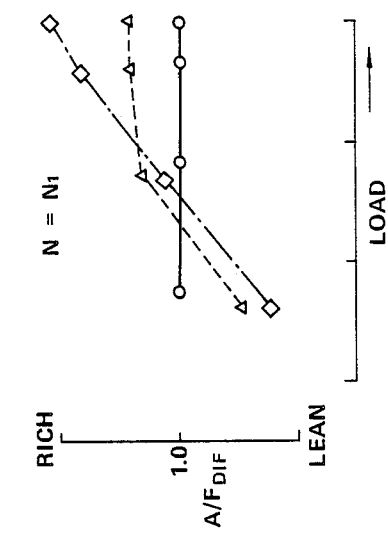
Figure 19B:
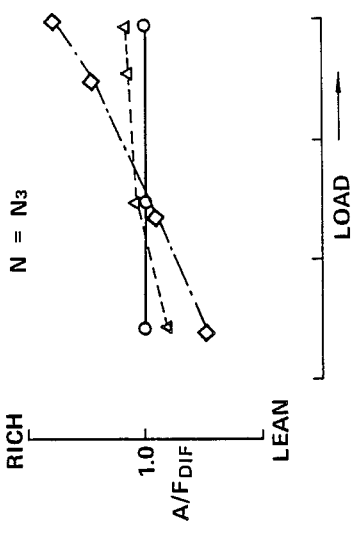
Figure 20B:
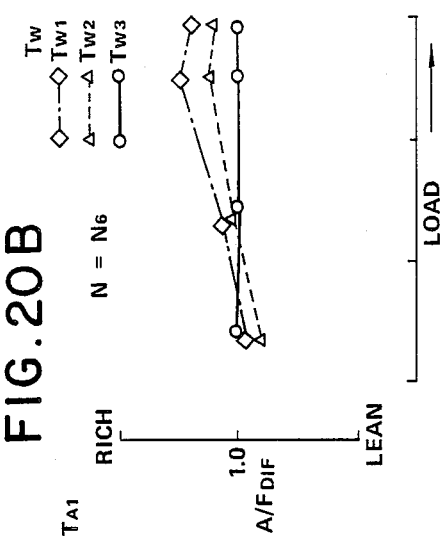
FIGS. 20(A), 20(B) and 20(C)) are illustration showing variation of air/fuel ratio relative to engine speed when the intake air temperature $T_A$, the engine coolant temperature Tw and the engine speed N are constant.
Figure 20A:
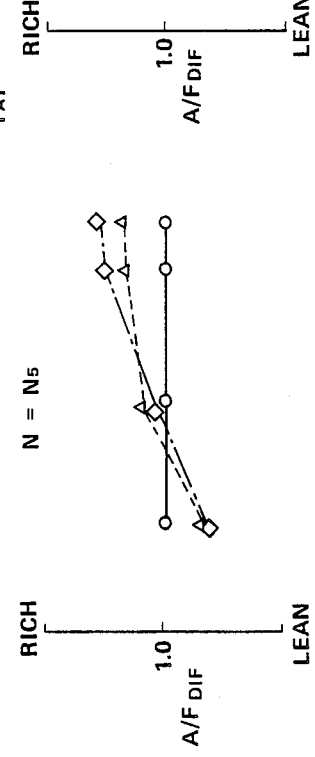
Figure 20C:
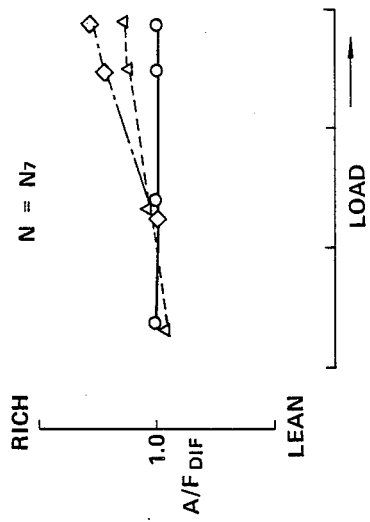

The influence of the engine coolant temperature and the engine load as set forth in the factors (i) through (v) may be summarized in the appended table. The observation summarized in the appended table can be confirmed by the results of experiments shown in FIG. 18(A), 18(b), 18(C) and 18(D). FIGS. 18(A), 18(b) and 18(C) shows arithmetically obtained variation of air/fuel ratio respectively taking the influence of the factors (i), (iii) and (iV) into account. Namely, FIG. 18(A) shows variation of the air/fuel ratio according to variation of the throttle valve path area $A_{th}$ due to difference of thermal expansion of the throttle body and the throttle valve. Arithmetic operations are taken place regarding that the engine load is constant. Furthermore, arithmetic operation has been taken place at with respect to mutually different engine load. In FIG. 17(A), the leftmost section shows the lowest load condition data and the rightmost section shows the highest load condition data. The second left section shows the air/fuel ratio variation at the engine load higher than that in the leftmost section but lower than the second right section. In FIG. 17(A), the vertical axis represents air/fuel ratio deviation from the stoichiometric value which is represented by the value 1. The deviation of the air/fuel ratio from the stoichiometric value will be hereafter referred to as "air/fuel ratio deviation $A/F_{DEV}$". Therefore, the air/fuel ratio data far from the horizontal line extending through 1 represents the air/fuel ratio far from the stoichiometric value. Similarly, air/fuel ratio variation is arithmetically obtained with taking the influence of variation of air density due to atomization of the fuel. The result is shown in FIG. 17(B). In FIG. 17(B), the four sections showing the results of arithmetic operation take the identical engine load as that discussed with respect to FIG. 17(A). Furthermore, the air/fuel ratio variation is arithmetically calculated with taking the influence of the air temperature difference at the intake air temperature sensor and at the throttle valve under the constant four mutually different engine load condition. The results are shown in FIG. 17(C). FIG. 17(D) shows sum of the aforementioned three arithmetically obtained values and the actually measured air/fuel ratio. As will be observed from FIG. 17(D), it will be appreciated that the arithmetically obtained values are substantially coincide with that actually measured.

From the result of experiments shown in FIGS. 17(A), 17(B), 17(C) and 17(D), it would be appreciated that in order to maintain the air/fuel ratio deviation $A/F_{DEV}$ at 1.0 regardless of the engine coolant temperature Tw and the engine load, it is necessary to correct the air flow rate indicative value by correction values derived with respect to respective shown correction factors, i.e. thermal expansion of throttle body, variation of air temperature due to adiabatic expansion through throttle valve, variation of air density due to atomization of fuel, temperature difference between the position where the intake air temperature sensor 22 and the position where the throttle valve is disposed.

In order to derive correction value with respect to respective four factors set forth above, additional experiments were performed to monitor air/fuel ratio variation in relation to each of four influencing factors. FIGS. 18 through 22 show the results of the results of experiments.

FIGS. 18(A), 18(B), 18(C) and 18(D) shows variation of the air/fuel ration in relation to variation of intake air temperature $T_A$ as monitored by the intake air temperature sensor 22. In the experiments, the linealized air flow amount $Q_{HO}$ as the parameter representative of the engine coolant temperature Tw and the engine load, and the engine speed N are maintained at constant value. As will be seen from FIGS. 18(A), 18(B), 18(C) and 18(D), the linearized air flow amount $Q_{HO}$ is varied in each experiments and held constant through each experiment at $Q_{HO1}$, $Q_{HO2}$, $Q_{HO3}$ and $Q_{HO4}$. As observed from FIGS. 18(A), 18(B), 18(C) and 18(D), the air/fuel ratio deviation $A/F_{DEV}$ varies in essentially parallel displacement manner according to variation of the engine coolant temperature. Therefore, engine coolant temperature dependent air flow rate value correction can be done by adding engine coolant temperature Tw dependent correction value KTATW which is derived based on a deviation of the engine coolant temperature from a predetermined reference temperature, to an intake air temperature $T_A$ dependent correction value KTA0. Therefore, the temperature dependent correction value KTA can be derived by:

$$KTA = KTA0 + KTATW \qquad (7)$$

FIGS. 19(A), 19(B), 19(C) and 19(D) and FIGS. 20(A), 20(B) and 20(C) show air/fuel ratio variation depending upon variation of engine load when the intake air temperature $T_A$, the engine coolant temperature Tw and the engine speed N are maintained constant. In the experiments, results of which are shown in FIGS. 19(A), 19(B), 19(C) and 19(D)and FIGS. 20(A), 20(B) and 20(C), are performed by maintaining the intake air temperature at $T_{A1}$ and varying the engine speed to $N_1$, $N_2$, $N_3$, $N_4$, $N_5$, $N_6$ and $N_7$ for each experiment.

As will be seen from FIGS. 19(A), 19(B), 19(C) and 19(D) and FIGS. 20(A), 20(B) and 20(C), air/fuel ratio variation depending upon the engine load is not linear to variation of the engine load as that observed in engine coolant temperature dependent air/fuel ratio variation. Therefore, the engine load dependent correction value KTAQH0 is derived from the result of experiments as a value to be multiplied with the engine coolant temperature dependent correction value KTATW. Similarly, since the air/fuel ratio does not vary linearly corresponding to the engine speed, the engine speed dependent correction value KTAN is also derived as a value to be multiplied with the engine coolant temperature dependent correction value KTATW based on the result of experiments. Consequently, the engine speed dependent and engine load dependent modification of the temperature dependent correction is performed according to:

$$KTA = KTA0 + KTATW \times KTAQH0 \times KTAN \qquad (8)$$

Respective correction coefficients, i.e. the intake air temperature dependent correction value KTA0, the engine coolant temperature dependent correction value KTATW, the engine load dependent correction value KTAQH0 and the engine speed dependent correction value KTAN, are respectively set in forms of look up tables in RAM 33. Respective characteristics of the tables of the intake air temperature dependent correction value KTA0, the engine coolant temperature dependent correction value KTATW, the engine load dependent correction value KTAQH0 and the engine speed dependent correction value KTAN are shown in FIGS. 12, 13, 14 and 15. The table storing the intake air temperature dependent correction value KTA0 will be hereafter referred to as "KTA0 table". Similarly, the tables respectively storing the engine coolant temperature dependent correction value KTATW, the engine load dependent correction value KTAQH0 and the engine speed dependent correction value KTAN will be hereafter referred to as "KTATW table", "KTAQH0 table" and "KTAN table".

It should be noted that the characteristics of respective of the intake air temperature dependent correction value KTA0, the engine coolant temperature dependent correction value KTATW, the engine load dependent correction value KTAQH0 and the engine speed dependent correction value KTAN, illustrated in FIGS. 12, 13, 14 and 15 are derived from actually measured values during experiments, the result of which are shown in FIGS. 21(A), 21(B), 21(C) and 21(D). In the shown embodiments, the unit of respective correction values are as follows:

| | |
|---|---|
| KTA | mg/cc |
| KTA0 | mg/cc |
| KTATW | mg/cc |
| KTAQH0 | % |
| KTAN | % |

Figure 6:
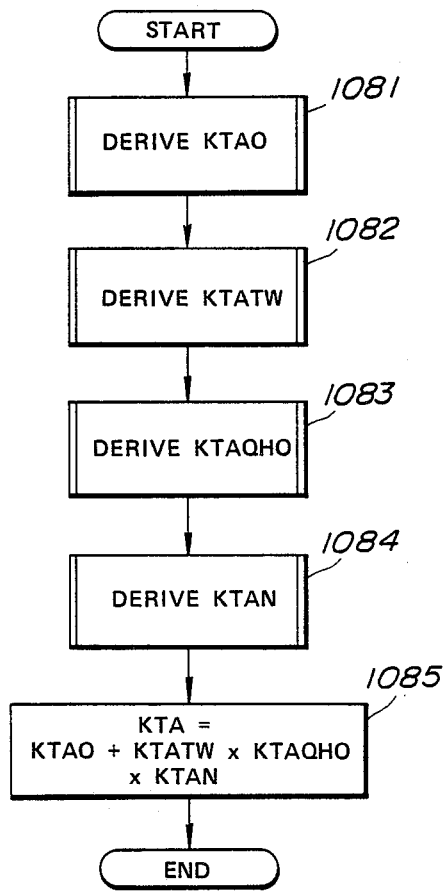
FIG. 6 is a flowchart showing a routine for deriving an intake air temperature dependent correction coefficient KTA.
Figure 7:
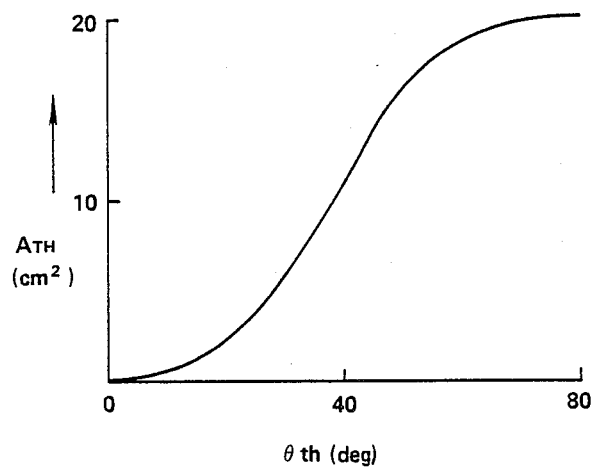
FIG. 7 is an illustration of a two-dimensional table for deriving an intake air flow path area $A_{th}$ to be looked up in terms of a throttle valve angular position $\theta_{th}$.
Figure 8:
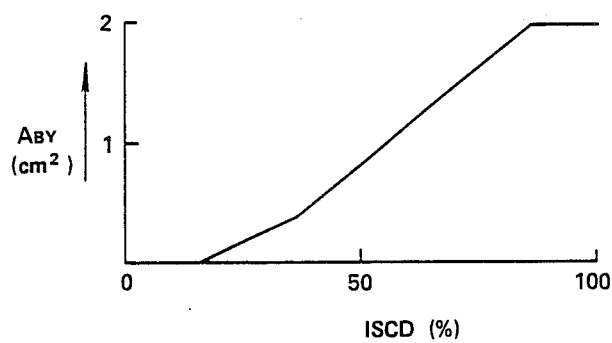
FIG. 8 is an illustration of a two-dimensional table for deriving a by-pass passage path are $A_{BY}$ to be looked up in terms of a duty cycle of a idling control valve control signal ISCD.
Figure 9:
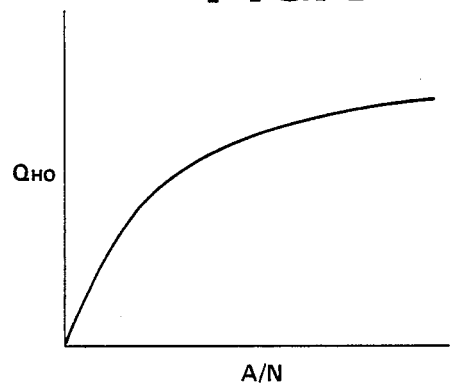
FIG. 9 is an illustration of a two-dimensional table for deriving a linearized intake air flow amount $Q_{HO}$ representative of basic air volume, to be looked up in terms of unit path area A/N per engine revolution cycle.
Figure 10:
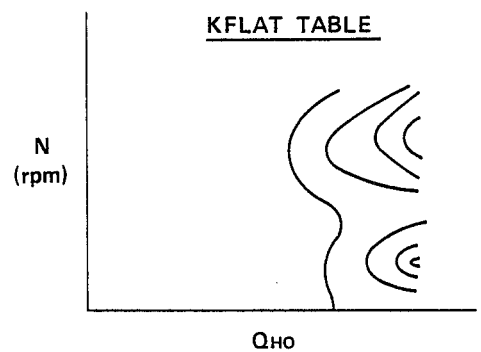
FIG. 10 is an illustration of a two-dimensional table for deriving an air flow amount correction rate KFLAT to be looked up in terms of a total air flow path area A and an engine speed N.

FIG. 6 shows a routine for deriving the correction value KTA as modified by the equation (8). As shown in FIG. 6, immediately after starting execution of the KTA deriving routine, the intake air temperature indicative signal of the intake air temperature sensor 22, which is representative of $T_A$, is read out at a step 1081. Based on the read intake air temperature $T_A$, table look-up against the KTA0 table is performed at the step 1081 for deriving the intake air temperature dependent correction value KTA0. At a step 1082, the engine coolant temperature indicative signal from the engine coolant temperature sensor 21 is read out to obtain the engine coolant temperature data Tw. Based on the engine coolant temperature data Tw, table loop-up against the KTATW table is performed at the step 1082 to derive the engine coolant temperature dependent correction value KTATW. At a step 1083, the linearized air flow amount data $Q_{HO}$ as the engine load representative data and derived at the step 1034 of the routine of FIG. 3, is read out. Based on the read linearized air flow amount data $Q_{HO}$ table loop-up against the KTAQH0 table is performed for deriving the engine load dependent correction value KTAQH0, at the step 1083. Subsequently, the engine speed data N is read out at a step 1084. Based on the engine speed data N, table look-up against the KTAN table is performed for deriving the engine speed dependent correction value KTAN at the step 1084.

Utilizing the correction values KTA0, KTATW, KTAQH0 and KTAN derived through the steps 1081, 1082, 1083 and 1084, the arithmetic operation according to the equation (8), set forth above, is performed for deriving the air temperature dependent correction value KTA, at a step 1085.

By the process set forth above, the intake air amount to be introduced into the engine cylinder can be derived in accurate manner irrespective of the environmental condition and the engine driving condition. Such accurate intake air amount thus derived will help precise control of air/fuel ratio. Furthermore, utilizing the accurately derived intake air amount, precise engine idling speed control, spark ignition control can be possible for optimizing the engine performance and for effective anti-polution engine control.

Look-up tables for deriving various correction values are advantageously employed in the shown embodiment for reducing process time for deriving the correction values based on various correction parameters. Such manner will be particularly effective for dealing with greater number of correction parameters for further precise measurement of the intake air amount.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment employs two-dimensional look-up tables, it may possible to employ three-dimensional table. Furthermore, though the shown embodiment takes the linealized air flow amount as the engine load representative parameter, it is possible to use other parameters, such as the throttle angular position $\theta_{th}$, the area ratio versus the engine speed A/N, the intake air volume $Q_{CYL}$ steady state air flow amount $Q_H$ and so forth can be a replacement of the linealized air flow amount, to represent the load condition on the engine.

What is claimed is:

1. A system for detecting intake air flow amount in an internal combustion engine, comprising:
    a first means for monitoring an engine revolution speed to produce an engine speed indicative first signal;
    a second means for driving a basic engine load indicative data on the basis of a path area of an air induction passage of said internal combustion engine and said first signal value, said second means producing a second signal indicative of said basic engine load;
    a third means for deriving a delay factor for introducing intake air into anengine cylinder on the basis of said first and secondsignal values, and
    a time dependent firs correction value for correcting said basic engine load indicative data on the basis of said delay factor; and
    a fourth means for modifying said second signal value on the basis of said first correction value and outputting a modified second signal as said intake air amount indicative signal indicative of the intake air amount.

2. An intake air amount detecting system as set forth in claim 1, wherein said second means includes a throttle angle sensor for monitoring a throttle angle position to produce a throttle angle signal as a data representative of path area of said intake air passage.

3. An intake air amount detecting system as set forth in claim 1, wherein said fourth means derives said delay factor which is a coefficient depending upon lag time of introduction into said engine cylinder from a position of said throttle valve to said engine cylinder.

4. An intake air amount detecting system as set forth in claim 1, which further comprises:
    a fifth means for monitoring a preselected engine driving parameter affecting density of intake air to produce a third signal;
    a sixth means for deriving an air density dependent second correction value for correcting said basic engine load indicative data on the basis of said third signal, and
    said fourth means further correcting said basic engine load indicative data as represented by said second signal and modified by said first correction value, by said second correction value.

5. An intake air amount detecting system as set forth in claim 1, wherein said fifth means includes an intake air temperature sensor for producing an intake air temperature indicative signal as said intake air density affecting parameter.

6. An intake air amount detecting system as set forth in claim 1, wherein said fifth means includes an engine coolant temperature sensor for producing an engine coolant temperature indicative signal as said intake air density affecting parameter.

7. An intake air amount detecting system as set forth in claim 4, wherein said sixth means derives said second correction value on the basis of said intake air temperature indicative signal.

8. An intake air amount detecting system as set froth in claim 7, wherein said fifth means further included an engine coolant temperature sensor for producing an engine coolant temperature indicative signal as the another intake air density affecting parameter, and said sixth means modifies said second correction value derived based on said intake temperature indicative signal based on said engine coolant temperature indicative signal value.

9. An intake air amount detecting system as set forth in claim 7, wherein said sixth means modifies said second correction value with a value derived on the basis of said first signal value.

10. An intake air amount detecting system as set forth in claim 7, wherein said sixth means modifies said second correction value with a value derived on the basis of said second signal value.

11. An intake air amount detecting system as set forth in claim 8, wherein said sixth means varies magnitude of modification of said second correction value on the basis of said engine coolant indicative signal value, depending upon said first signal value.

12. An intake air amount detecting system as set forth in claim 8, wherein said sixth means varies magnitude of modification of said second correction value derived on the basis of said engine coolant temperature indicative signal value depending upon said second signal value.

13. An intake air amount detecting system as set forth in claim 12, wherein said sixth means further varies magnitude of modification of said second correction value derived on the basis of said engine coolant temperature indicative signal value depending upon said second signal value.

14. An intake air amount detecting system as set forth in claim 4, wherein said intake air temperature sensor is disposed within said intake air passage at a position upstream of said throttle valve.

15. A system for detecting intake air flow amount in an internal combustion engine, comprising:
    a first means for monitoring an engine revolution speed to produce an engine speed indicative first signal;
    a second means for deriving a basic engine load indicative data on the basis of an air induction passage of said internal combustion engine and said first signal value, said second means producing a second signal indicative of said basic engine load;
    a third means for monitoring a preselected engine driving parameter affecting density of intake air to produce a third signal;
    a fourth means for deriving a delay factor for introducing intake air into an engine cylinder on the basis of said first and second signal values, and deriving a time dependent first correction value for correcting said basic engine load indicative data on the basis of said delay factor;
    a fifth means for deriving an air density dependent second correction value for correcting said basic engine load indicative data on the basis of said third signal; and
    a sixth means for modifying said second signal value on the basis of said first and second correction values and outputting a modified second signal as said intake air amount indicative signal indicative of the intake air amount.

16. An intake air amount detecting system as set forth in claim 15, wherein said second means includes a throttle angle sensor for monitoring a throttle angle position to produce a throttle angle signal as a data representative of path area of said intake air passage.

17. An intake air amount detecting system as set forth in claim 15, wherein said fourth means derives said delay factor which is a coefficient depending upon lag time of introduction into said engine cylinder from a position of said throttle valve to said engine cylinder.

18. An intake air amount detecting system as set forth in claim 15, wherein said third means includes an intake air temperature sensor for producing an intake air temperature indicative signal as said intake air density affecting parameter.

19. An intake air amount detecting system as set forth in claim 15, wherein said third means includes an engine coolant temperature sensor for producing an engine coolant temperature indicative signal as said intake air density affecting parameter.

20. An intake air amount detecting system as set forth in claim 19, wherein said fifth means derives said second correction value on the basis of said intake air temperature indicative signal.

21. An intake air amount detecting system as set froth in claim 20, wherein said third means further included an engine coolant temperature sensor for producing an engine coolant temperature indicative signal as the another intake air density affecting parameter, and said fifth means modifies said second correction value derived based on said intake temperature indicative signal based on said engine coolant temperature indicative signal value.

22. An intake air amount detecting system as set forth in claim 20, wherein said fifth means modifies said second correction value with a value derived on the basis of said first signal value.

23. An intake air amount detecting system as set forth in claim 20, wherein said fifth means modifies said second correction value with a value derived on the basis of said second signal value.

24. An intake air amount detecting system as set forth in claim 16, wherein said fifth means varies magnitude of modification of said second correction value on the basis of said engine coolant indicative signal value, depending upon said first signal value.

25. An intake air amount detecting system as set forth in claim 16, wherein said fifth means varies magnitude of modification of said second correction value derived on the basis of said engine coolant temperature indicative signal value depending upon said second signal value.

26. An intake air amount detecting system as set forth in claim 25, wherein said fifth means further varies magnitude of modification of said second correction value derived on the basis of said engine coolant temperature indicative signal value depending upon said second signal value.

27. An intake air amount detecting system as set forth in claim 18, wherein said intake air temperature sensor is disposed within said intake air passage at a position upstream of said throttle valve.

28. A system for detecting intake air flow amount in an internal combustion engine, comprising:
- a first means for monitoring an engine revolution speed to produce an engine speed indicative first signal;
- a second means for monitoring a throttle valve open angle for deriving a basic engine load indicative data on the basis thereof and said first signal value, said second means producing a second signal indicative of said basic engine load;
- a third means for deriving a delay factor for introducing intake air into an engine cylinder on the basis of said first and second signal values, and deriving a time dependent first correction value for correcting said basic engine load indicative data on the basis of said delay factor; and
- a fourth means for modifying said second signal value on the basis of said first correction value and outputting a modified second signal as said intake air amount indicative signal indicative of the intake air amount.

29. A system for detecting intake air flow amount in an internal combustion engine, comprising:
- a first means for monitoring an engine revolution speed to produce an engine speed indicative first signal;
- a second means for monitoring a throttle valve open angle for deriving a basic engine load indicative data on the basis thereof and said first signal value, said second means producing a second signal indicative of said basic engine load;
- a third means for monitoring a preselected engine driving parameter affecting density of intake air to produce a third signal;
- a fourth means for deriving a delay factor for introducing intake air into an engine cylinder on the basis of said first and second signal values, and deriving a time dependent first correction value for correcting said basic engine load indicative data on the basis of said delay factor;
- a fifth means for deriving an air density dependent second correction value for correcting said basic engine load indicative data on the basis of said third signal; and
- a sixth means for modifying said second signal value on the basis of said first and second correction values and outputting a modified second signal as said intake air amount indicative signal indicative of the intake air amount.

* * * * *